T. C. GIBSON.
PENKNIFE.
APPLICATION FILED MAR. 16, 1921.

1,394,166.

Patented Oct. 18, 1921.

Inventor
T. C. Gibson,
By Watson E. Coleman
Attorney

UNITED STATES PATENT OFFICE.

THOMAS C. GIBSON, OF FORSYTH, GEORGIA.

PENKNIFE.

1,394,166.  Specification of Letters Patent.  Patented Oct. 18, 1921.

Application filed March 16, 1921. Serial No. 452,865.

*To all whom it may concern:*

Be it known that I, THOMAS C. GIBSON, a citizen of the United States, residing at Forsyth, in the county of Monroe and State of Georgia, have invented certain new and useful Improvements in Penknives, of which the following is a specification, reference being had to the accompanying drawings.

In penknives, particularly in the two bladed type, one blade being at each end, and also in the kind where there are one or more blades at each end, the long blade frequently is so alined with the short blade, that upon an attempt to close the short blade, the butt of the short blade will contact with the point of the long blade, thereby obstructing closing the short blade.

The purpose of the present invention is to avoid this difficulty in knives of this character, and to accomplish this result the invention aims to provide a beveled off portion or cam on the butt end of the short blade adjacent its inner edge, so that when an attempt is made to close the short blade, the point of the long blade will contact with and cam upon the beveled off portion, thereby deflect the end portion of the long blade to its proper side, allowing the short blade to close correctly.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1:
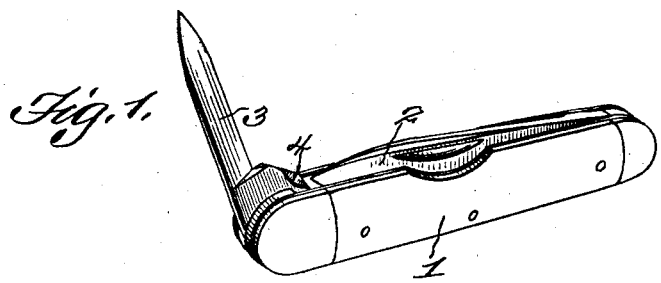
Figure 1 is a perspective view of one end of the handle of a two bladed penknife, showing the longer blade closed, and the shorter blade partly closed, clearly showing the bevel or cam surface on the butt end of the short blade, just in the act of being engaged by the point of the long blade.
Figure 2:
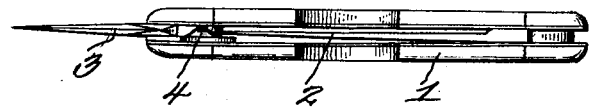
Fig. 2 is an edge view of one end of the handle of a penknife on an enlarged scale, showing the point of the long blade in the act of being deflected to one side to permit closing of the short blade.

Referring to the drawings, 1 designates the handle of the penknife, which may be of any suitable construction, and 2 denotes the long blade, and 3 the short blade. Though only two blades are disclosed in the present instance, it is obvious that any number of blades may be used. The butt end of the short blade on one edge thereof is provided with a beveled off or cam surface 4, and it will be noted that the long blade is of such length that upon an attempt to close the short blade, the point of the long blade would contact with the butt end of the short blade, thereby preventing its closing. However, owing to the beveled off or cam surface of the butt end of the short blade, the point of the long blade will contact with said surface, and thereby be deflected to its proper side of the butt end of the short blade, permitting the short blade to close in correct position.

The invention having been set forth, what is claimed as being useful is:

1. In a penknife, a handle provided with a long blade and a short blade pivotally mounted at the opposite ends of the handle, the butt end of the short blade being pivoted out of alinement with the pivotal mounting of the long blade, the length of the long blade being such that on attempting to close the short blade, the point of the long blade approximates a closed position to the butt end of the short blade, and means on the butt end of the short blade to deflect the pointed end of the long blade to its proper side.

2. In a penknife, a handle, long and short blades pivotally connected to the opposite ends of the handle, the length of the long blade being such that it may approximate the butt end of the short blade, the butt end of the short blade adjacent one edge thereof having a beveled or cam surface to be engaged by the pointed end of the long blade, to deflect it to its proper side allowing the short blade to close in its proper place.

3. The combination with a penknife handle, of long and short blades pivotally connected to the opposite ends of the handle, and means carried by the butt end of the short blade coöperating with the point of the long blade to deflect the latter to its proper side allowing the short blade to close in its proper place.

4. The combination with a penknife handle, of blades pivotally connected to the opposite ends of the handle, and means carried by the butt end of one blade coöperating with the point of the other blade when in closed position, preventing the first blade when being closed from closing on the wrong side of the closed blade.

In testimony whereof I hereunto affix my signature.

THOMAS C. GIBSON.